March 11, 1930. T. W. A. RUSCHE 1,749,850
AUTOMATIC HEAT MEDIUM CONTROL DEVICE
Filed Jan. 22, 1929
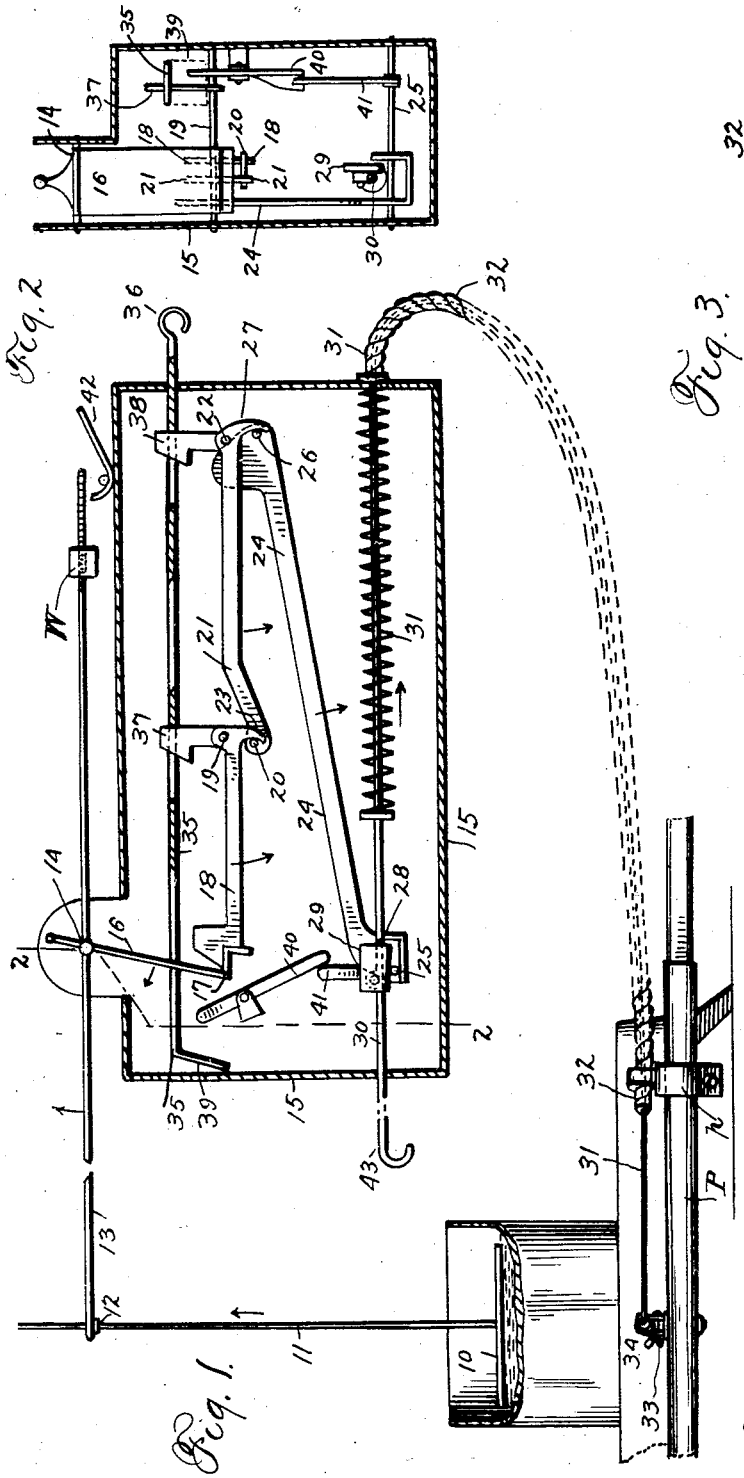
Inventor
T. W. A. Rusche,
by
Chas. Williamson
Attorney Patented Mar. 11, 1930

1,749,850

UNITED STATES PATENT OFFICE

THEODORUS WILLEM ALBERT RUSCHE, OF OOSTERBEEK, NETHERLANDS

AUTOMATIC HEAT-MEDIUM-CONTROL DEVICE

Application filed January 22, 1929, Serial No. 334,297, and in the Netherlands December 31, 1927.

Occasion often arises for switching on or off an electric current or other source of heat, or putting in action or stopping some other device, on the attainment of a certain level by a given liquid, or on the occurrence of a change in the density of the liquid. Devices for preventing milk from boiling over may be cited by way of example.

Various devices have been proposed for this purpose but those known to me have not proved satisfactory in practice. In these devices use is made of a float which approximately fits the boiling vessel and a relatively considerable effort is needed to actuate the mechanism. A drawback of this arrangement is that such a float cannot be used for smaller vessels and, in addition, it presents a relatively large surface to be cleaned after use. Moreover, the entire device must be attached to the boiling vessel, or cooker, for which reason cleaning is rendered difficult. A float substantially smaller in diameter than the vessel has the drawback that the liquid may rise around and above it and thus not move the float.

The present invention provides a device of great sensitiveness and low inertia so that it fulfills all practical requirements and is free from the above mentioned drawbacks. The embodiment hereinafter described, is designed for domestic use for preventing milk from boiling over.

A device according to my invention has a small float that actuates a balanced and therefore easily operated system of levers which put in action a spring operated member which brings about the desired movement of switch or key, or other part.

The drawing illustrates a device according to the invention intended to prevent milk from boiling over.

In such drawings:—

Fig. 1 is a longitudinal section of the device in position for operation, associated with a gas stove;

Fig. 2 is a cross section on line 2—2 of Fig. 1;

Fig. 3 is a top plan view of a gas tap with a lever handle, with which my device is connected to turn off the gas as shown in Fig. 1.

The float is a small disk, 10, on the lower end of a vertical stem, 11, that is adjustably connected at 12, with a balanced horizontal lever, 13, fixed on a spindle, 14, mounted in the casing 15. An adjustable weight, W, serves to counterbalance the disk, 10, and stem, 11. The spindle of the balanced lever is fixedly connected with a lever, 16, that hangs therefrom and at its lower end has a pawl, 17, which extends horizontally to catch under and support from downward movement the free end of a horizontal lever, 18, which is pivoted at 19. By means of a horizontal pin, 20, a second lever, 21, pivoted near one end at 22, engages a pawl, 23, on the lever, 21. Another lever, 24, which is pivoted at 25, is engaged and held by means of a horizontal pin, 26, by a pawl, 27 of the lever, 21. Said lever, 24, near its pivoted end has a latch, 28, formed by a bent edge of the lever which is adapted to engage a shoulder, 29, on a horizontal rod, 30, which by a coil spring, 31, encircling said rod tends to move in the direction in which movement is opposed by said latch and which rod by suitable means is connected with the handle of the valve of the gas pipe by which gas is supplied to the stove for subjecting the liquid in question to heat or boiling or cooking temperature. Said spring is a tension spring and when the latch, 28, releases the rod, 30, the latter is moved by the contraction of the spring and thereby the gas valve is turned off. The connection between the rod, 30, and the gas valve may be the well-known device of a flexible wire which passes through a flexible container that guides the wire in longitudinal movement even though the wire with its container may not extend in a straight line, so that to suit the location of the valve operating device, with reference to the valve, the connection between the rod, 30, and the gas valve need not be in a direct line. Referring to Fig. 1, it will be seen that the flexible wire, 31, which at one end is connected with the rod, 30, after passing a short distance beyond the end of its flexible cover, 32, is attached at its end to a clamp, 33, applied to the ordinary lever handle gas valve, 34. The cover, 32, is fixed at one end to casing, 15, and the other end to a clamp, p, on the gas pipe, P.

It will be seen that there is a system of interengaged levers between the float-operated balanced lever and the spring-pulled rod, 30, that provides a very sensitive and readily operated mechanism that assures the release of the spring-pulled rod, 30, at the appointed time in the heating operation to secure the quick cutting off of heat from the liquid being boiled.

To reset the lever-system, a flat bar, 35, is horizontally slidable in the upper part of the casing, with a handle, 36, outside the casing, and which is slotted to straddle and engage a radial arm, 37, on lever, 18, and a similar arm, 38, on lever, 21, so as to rock the free ends of each lever upward and cause them to be engaged by their latch pawls, 17, 23 and 27. The end of lever, 18, trips over its pawl, 17.

On the end of the flat bar, 35, is a downturned finger, 39, which as said bar is moved to resetting position engages the upper end of a lever, 40, whose lower end is in position to engage an arm, 41, attached to the lever, 24, and thereby said lever, 24, is reset. The arm-engaging slots of the flat bar, 35, and the finger, 39, are so positioned that the three levers to be reset are moved in succession. After resetting operation, the resetting bar, 35, is movable to its former position where it will not interfere with the movements of the levers. Beneath the end of the balanced lever, 13, opposite that engaged by the float stem is a lever, 42, for lifting that end of the balanced lever to reset the mechanism and place the pawl, 17, into its lever-engaging position, said lever, 42, being normally not in position to be engaged by the balanced lever, 13.

The rod, 30, upon which the spring acts to move the valve to shut off gas, has outside the casing a handle, 43, so that said rod may be pulled to transmit motion to the valve handle to turn the gas on and to place the spring under tension. The shoulder, 29, on the rod, 30, which cooperates with the lever latch, 28, is yieldable or movable so that it will pass over the latch edge, 28, when the rod, 30, is moved to turn on the gas.

By reason of the flexible connection between the spring-pulled rod, 30, and the gas valve handle, it will be evident that my mechanism for closing the valve can be placed at any suitable point with reference to the gas stove without being mounted upon or attached to the latter. For example, it can be suspended by a suitable bracket from an adjacent wall surface.

It will be observed that all of the levers have arms that are relatively long and short and that the pawl-engaging parts of the levers are carried by the long arms thereof, and it is movement of the short arms which results in the releasing operation, so that such operation occurs easily and quickly.

What I claim is:—

A float-operated shut-off device comprising the combination of means for controlling a heating medium, a spring-actuated member connected therewith, a plurality of levers with releasable interengaging means, one of which prevents movement of the spring-actuated member by the spring, a float adapted to contact with liquid in a vessel to be heated, a float releasing latch for another of said levers, and a single resetting member for all said levers.

In testimony whereof, I have signed my name to this specification.

THEODORUS WILLEM ALBERT RUSCHE.